(12) United States Patent
Cho et al.

(10) Patent No.: US 10,276,375 B2
(45) Date of Patent: Apr. 30, 2019

(54) ASSISTANT PATTERN FOR MEASURING CRITICAL DIMENSION OF MAIN PATTERN IN SEMICONDUCTOR MANUFACTURING

(71) Applicant: Taiwan Semiconductor Manufacturing Co., Ltd., Hsin-Chu (TW)

(72) Inventors: Hung-Wen Cho, Hsin-Chu (TW); Wen-Chen Lu, Hsinchu County (TW); Chaos Tsai, Hsin-Chu County (TW); Feng-Jia Shiu, Hsinchu County (TW)

(73) Assignee: TAIWAN SEMICONDUCTOR MANUFACTURING CO., LTD., Hsin-Chu (TW)

( * ) Notice: Subject to any disclaimer, the term of this patent is extended or adjusted under 35 U.S.C. 154(b) by 245 days.

(21) Appl. No.: 15/356,450

(22) Filed: Nov. 18, 2016

(65) Prior Publication Data

US 2018/0144936 A1 May 24, 2018

(51) Int. Cl.
*G06F 17/50* (2006.01)
*G03F 1/20* (2012.01)
(Continued)

(52) U.S. Cl.
CPC ............ *H01L 21/0334* (2013.01); *G03F 1/20* (2013.01); *G03F 1/44* (2013.01); *G03F 7/70058* (2013.01); *G03F 7/70625* (2013.01); *G03F 7/70683* (2013.01); *G06F 17/5045* (2013.01); *G06F 17/5081* (2013.01); *H01L 22/20* (2013.01); *H01L 22/30* (2013.01); *H01L 23/544* (2013.01); *G06F 2217/12* (2013.01); *H01L 22/12* (2013.01); *H01L 2223/54426* (2013.01)

(58) Field of Classification Search
CPC ............ G06F 17/5081; G06F 17/5045; G06F 2217/12; G03F 1/20; G03F 1/44; G03F 7/70058; G03F 7/70625; G03F 7/70683; H01L 21/0334; H01L 22/20; H01L 22/30; H01L 22/12
USPC ......... 716/55, 53, 54, 112; 450/4, 5; 378/34, 378/35; 700/120, 121
See application file for complete search history.

(56) References Cited

U.S. PATENT DOCUMENTS

6,040,118 A * 3/2000 Capodieci ............. G03F 7/2022
430/328
8,527,916 B1 9/2013 Chiang et al.
(Continued)

*Primary Examiner* — Phallaka Kik
(74) *Attorney, Agent, or Firm* — Haynes and Boone, LLP (57) ABSTRACT

A method includes receiving an integrated circuit (IC) layout having a pattern layer. The pattern layer includes a main layout pattern. A dimension W1 of the main layout pattern along a first direction is greater than a wafer metrology tool's critical dimension (CD) measurement upper limit. The method further includes adding a plurality of assistant layout patterns into the pattern layer. The plurality of assistant layout patterns includes a pair of CD assistant layout patterns on both sides of the main layout pattern along the first direction. The pair of CD assistant layout patterns have a substantially same dimension W2 along the first direction and are about equally distanced from the main layout pattern by a dimension D1. The dimensions W2 and D1 are greater than a printing resolution in a photolithography process and are equal to or less than the wafer metrology tool's CD measurement upper limit.

20 Claims, 10 Drawing Sheets

(51) Int. Cl.
*G03F 7/00* (2006.01)
*H01L 21/033* (2006.01)
*G03F 7/20* (2006.01)
*H01L 21/66* (2006.01)
*G03F 1/44* (2012.01)
*H01L 23/544* (2006.01)

(56) References Cited

U.S. PATENT DOCUMENTS

| | | |
|---|---|---|
| 8,572,520 B2 | 10/2013 | Chou et al. |
| 8,589,828 B2 | 11/2013 | Lee et al. |
| 8,589,830 B2 | 11/2013 | Chang et al. |
| 8,627,241 B2 | 1/2014 | Wang et al. |
| 8,631,360 B2 | 1/2014 | Wang et al. |
| 8,631,361 B2 | 1/2014 | Feng |
| 8,716,841 B1 | 5/2014 | Chang et al. |
| 8,732,626 B2 | 5/2014 | Liu et al. |
| 8,736,084 B2 | 5/2014 | Cheng et al. |
| 8,739,080 B1 | 5/2014 | Tsai et al. |
| 8,745,550 B2 | 6/2014 | Cheng et al. |
| 8,751,976 B2 | 6/2014 | Tsai et al. |
| 8,762,900 B2 | 6/2014 | Shin et al. |
| 8,812,999 B2 | 8/2014 | Liu et al. |
| 8,837,810 B2 | 9/2014 | Chen et al. |
| 8,850,366 B2 | 9/2014 | Liu et al. |
| 9,195,134 B2 | 11/2015 | Huang et al. |
| 9,213,233 B2 | 12/2015 | Chang et al. |
| 10,109,642 B2* | 10/2018 | Son ............... H01L 27/11578 |
| 2002/0164065 A1* | 11/2002 | Cai ............... G01N 21/95607 382/149 |
| 2007/0046954 A1* | 3/2007 | Joseph Cramer ... G03F 7/70516 356/625 |
| 2007/0246787 A1* | 10/2007 | Wang ............... H01L 43/08 257/421 |
| 2008/0241756 A1* | 10/2008 | Lehr ............... G03F 7/70466 430/312 |
| 2009/0317749 A1* | 12/2009 | Lee ............... G03F 1/144 430/319 |
| 2010/0081068 A1* | 4/2010 | Kim ............... G03F 1/44 430/5 |
| 2012/0115073 A1* | 5/2012 | Ho ............... G03F 1/36 430/5 |
| 2012/0308112 A1 | 12/2012 | Hu et al. |
| 2013/0201461 A1 | 8/2013 | Huang et al. |
| 2013/0267047 A1 | 10/2013 | Shih et al. |
| 2014/0101624 A1 | 4/2014 | Wu et al. |
| 2014/0109026 A1 | 4/2014 | Wang et al. |
| 2014/0111779 A1 | 4/2014 | Chen et al. |
| 2014/0119638 A1 | 5/2014 | Chang et al. |
| 2014/0120459 A1 | 5/2014 | Liu et al. |
| 2014/0123084 A1 | 5/2014 | Tang et al. |
| 2014/0226893 A1 | 8/2014 | Lo et al. |
| 2014/0253901 A1 | 9/2014 | Zhou et al. |
| 2014/0256067 A1 | 9/2014 | Cheng et al. |
| 2014/0257761 A1 | 9/2014 | Zhou et al. |
| 2014/0282334 A1 | 9/2014 | Hu et al. |
| 2016/0292348 A1* | 10/2016 | Lei ............... G03F 1/36 |

* cited by examiner

ASSISTANT PATTERN FOR MEASURING CRITICAL DIMENSION OF MAIN PATTERN IN SEMICONDUCTOR MANUFACTURING

BACKGROUND

The semiconductor integrated circuit (IC) industry has experienced exponential growth. Technological advances in IC materials and design have produced generations of ICs where each generation has generally smaller and more complex circuits than the previous generation. This scaling down process generally provides benefits by increasing production efficiency and lowering associated costs. Such scaling down has also increased the complexity of processing and manufacturing ICs.

For example, in certain ICs it is common to have both small and large features on the same chip. One example is CMOS image sensors. A logic area in a CMOS image sensor may include transistor features as small as few tens of nanometers (nm), while a sensing area of the CMOS image sensor may include light sensitive regions or light blocking regions as large as few tens of microns (µm). Another example is biochips which may include openings (or windows) for receiving large DNA samples as well as processing circuitry that are made of nano-sized circuit features. When manufacturing these types of chips, measuring critical dimension (CD) of the circuit features, both large and small, is quite challenging because typical CD measurement tools (e.g., wafer metrology tools) are incapable of measuring both large and small features with acceptable accuracy. For example, many wafer metrology tools specify an upper limit of the target (to-be-measured) CD, beyond which the measurement accuracy is not guaranteed. The upper limit may be only few microns or less. Further, even within the upper limit, the measurement accuracy may be only guaranteed to be within few percentages, such as 1%. For a circuit feature as large as 10 µm, the CD measurement inaccuracy (or error) could be 100 nm or more, which could be unacceptable considering that nearby circuit features only have CDs in tens of nanometers. Maintaining the spatial relationship between these large and small features during IC manufacturing would become very difficult with the large CD measurement errors.

Improvements in these areas are desired.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The present disclosure is generally related to semiconductor manufacturing and more particularly to critical dimension (CD) measurements of large main patterns during semiconductor manufacturing.

Embodiments of the present disclosure insert assistant patterns into an IC design layout, particularly adjacent to a large main pattern, to aid in the CD measurement of the main pattern. As used herein, a "main pattern" of an IC refers to a pattern that is configured to perform certain intended function(s) of the IC, while an "assistant pattern" of an IC refers to a pattern that helps the manufacturability of the IC but is not configured to perform any intended function(s) of the IC.

The present disclosure will discuss patterns, including main patterns and assistant patterns, at different stages of designing and manufacturing of an IC. Particularly, the present disclosure will discuss patterns at IC design layout stage, at IC mask (or photo mask) stage, and at wafer fabrication stage such as resist exposing and developing stage. For ease of understanding, patterns at an IC design layout are also referred to as "layout patterns," patterns at an IC mask "mask patterns," and patterns at a developed resist of a wafer "resist patterns" or "wafer patterns." Furthermore, the present disclosure will discuss the dimensions of the various patterns above. For the convenience of discussion, the dimensions of layout patterns, mask patterns, and resist patterns are normalized to dimensions on the wafer. For example, a mask pattern may have an actual dimension M1 on a mask. When this mask pattern is imaged (or printed) onto a wafer, the imaging tool may reduce the mask pattern by a factor F and produce a resist pattern having a dimension M1/F. For the convenience of discussion, the normalized dimension (or simply the "dimension") of the mask pattern is M1/F. In contrast, a layout pattern is usually drawn to match its target dimension on a wafer. Therefore, its dimension is already "normalized" to wafer dimension, so is true for resist patterns.

Figure 1:
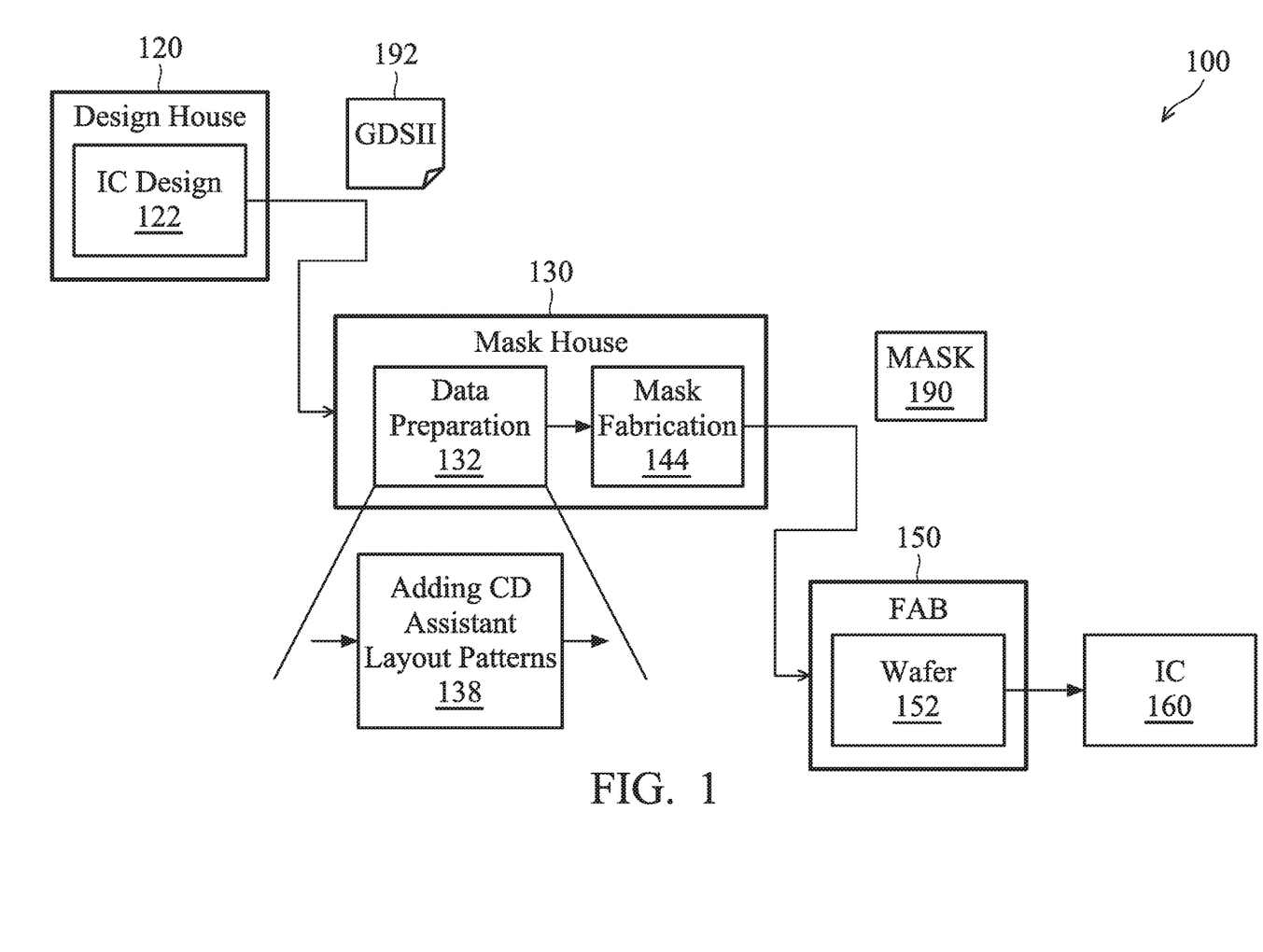
FIG. 1 is a simplified block diagram of an integrated circuit (IC) manufacturing system and an associated IC manufacturing flow, in accordance with some embodiments.

FIG. 1 is a simplified block diagram of an embodiment of an integrated circuit (IC) manufacturing system 100 and an IC manufacturing flow associated therewith. The IC manufacturing system 100 includes a plurality of entities, such as a design house 120, a mask house 130, and an IC manufacturer 150 (i.e., a fab), that interact with one another in the design, development, and manufacturing cycles and/or services related to manufacturing an IC device 160. The plurality of entities are connected by a communications network, which may be a single network or a variety of different networks, such as an intranet and the Internet, and may include wired and/or wireless communication channels. Each entity may interact with other entities and may provide services to and/or receive services from the other entities. One or more of the design house 120, mask house 130, and fab 150 may be owned by a single company, and may even coexist in a common facility and use common resources.

The design house (or design team) 120 generates an IC design layout 122. The IC design layout 122 includes various geometrical patterns designed for an IC product. The geometrical patterns correspond to patterns of metal, oxide, or semiconductor layers that make up the various components of the IC device 160 to be fabricated. For example, a portion of the IC design layout 122 may include IC features such as active regions, gate electrodes, source and drain features, metal lines or vias of an interlayer interconnect, openings for bonding pads, and light sensitive elements such as photodiodes, to be formed in or on a semiconductor substrate (such as a silicon wafer). The design house 120 implements a proper design procedure to form the IC design layout 122. The design procedure may include logic design, physical design, and/or place and route. The IC design layout 122 is presented in one or more data files 190 having information of the geometrical patterns. For example, the IC design layout 122 may be expressed in a GDSII file format, DFII file format, or other suitable file formats.

The mask house 130 uses the IC design layout 122 to manufacture one or more masks to be used for fabricating the various layers of the IC device 160. The mask house 130 performs mask data preparation 132, where the IC design layout 122 is translated into a form that can be physically written by a mask writer, and mask fabrication 144, where the design layout prepared by the mask data preparation 132 is modified to comply with a particular mask writer and/or mask manufacturer and is then fabricated. In the present embodiment, the mask data preparation 132 and mask fabrication 144 are illustrated as separate elements. However, the mask data preparation 132 and mask fabrication 144 can be collectively referred to as mask data preparation.

Figure 2A:
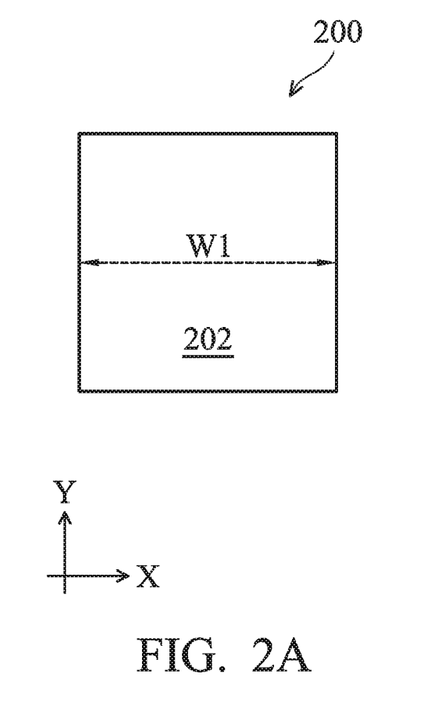
FIG. 2A illustrates a main pattern in an IC layout, in accordance with some embodiments.

In the present embodiment, the mask data preparation 132 includes a module 138 for adding assistant patterns into the IC design layout 122, particularly adjacent to large main patterns for the purposes of aiding in the measurement of CDs of the large main patterns at the fab 150. As discussed in the Background section, measuring CD of a large pattern using wafer metrology tools (such as a scanning electron microscope (SEM)) can be challenging. For example, a typical commercial wafer metrology tool may have an upper limit of 1 µm for CD measurement for a guaranteed 1% measurement accuracy (i.e., the difference between the actual CD and the measured CD is within 1%). When a pattern's actual CD exceeds this upper limit, the measurement accuracy may become worse than 1%. FIG. 2A shows an exemplary main layout pattern 202 in a pattern layer (or layout layer) 200 of the IC design layout 122. The dimension W1 of the main pattern 202 along the "X" axis exceeds the upper limit of a wafer metrology tool's CD measurement capability. For example, while the upper limit of the wafer metrology tool's CD measurement capability is 1 µm, W1 may be in a range from 1 to 50 µm. The present disclosure provides novel solutions for accurately measuring the dimension W1 in fab 150 using the existing wafer metrology tool such as an SEM. Even though the main pattern 202 is illustrated as a rectangular pattern in FIG. 2A, it is not so limiting. In various embodiments, the inventive concept discussed below can be applied to the main pattern 202 having various shapes such as a rectangle, a square, an L shape, an oval, any polygon, or an irregular shape.

Figure 2B:
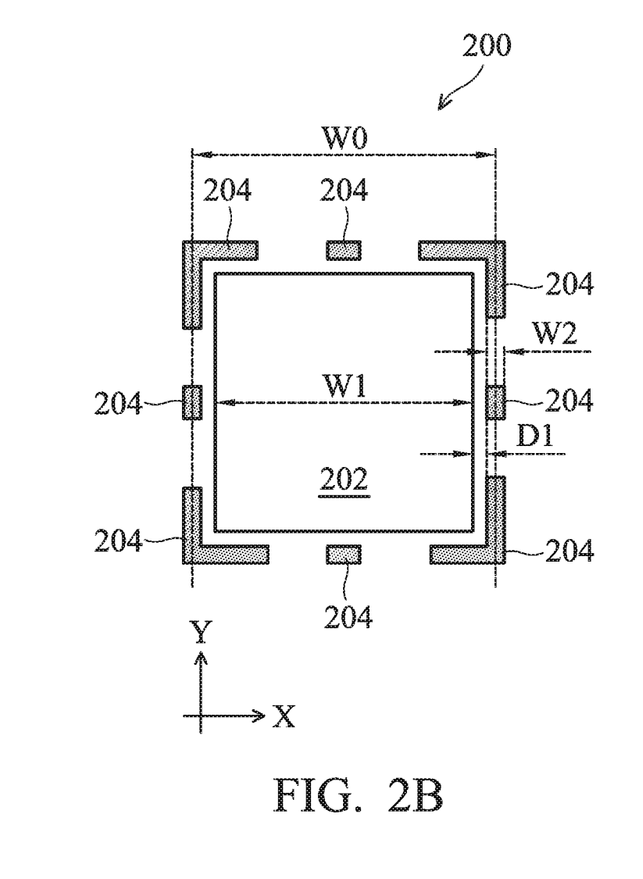
FIGS. 2B and 2C each illustrate the main pattern of the IC layout of FIG. 2A and a plurality of assistant patterns, in accordance with some embodiments.

In an embodiment, the module 138 is configured to insert assistant layout patterns 204 adjacent to the main pattern 202. An example of the pattern layer 200 with the assistant patterns 204 inserted is shown in FIG. 2B. Referring to FIG. 2B, the assistant patterns 204 may be bar-shaped, such as the ones on the center lines of the main pattern 202 along the X and Y axis. The assistant patterns 204 may also be L-shaped, such as the ones around the corners of the main pattern 202 with its concaved corner facing the main pattern 202. Both bar shape and L shape are found to be CD-measurement-friendly: the shapes can be imaged (or printed) onto a wafer and can be located and measured by a wafer metrology tool. For the L-shaped assistant patterns 204, of particular interest are their vertical and horizontal members which can aid in the measurement of the dimension W1, which will be discussed below. Therefore, even though the 90-degree corner of the L-shape may or may not be printed perfectly onto a wafer, the L-shape is still considered CD-measurement-friendly. The assistant patterns 204 may take other CD-measurement-friendly shapes besides the bar shape and the L shape. In the following discussion, the assistant patterns 204 may also be referred to as "CD assistant patterns" 204.

In the present embodiment, the CD assistant patterns 204 adjacent to left and right sides of the main pattern 202 along the horizontal center line are configured to have a dimension W2 and are distanced from the main pattern 202 by a dimension D1. The dimensions W2 and D1 are measured along the same direction (the X axis) as the dimension W1. Unlike sub-resolution patterns typically used in optical proximity correction (OPC), the dimensions W2 and D1 are greater than a printing resolution in a photolithography (or lithography) process. In other words, the CD assistant patterns 204 as well as the gap between the CD assistant patterns 204 and the main pattern 202 can be printed onto a wafer in the lithography process. Furthermore, the dimension W2 and D1 are designed to be less than or equal to the wafer metrology tool's CD measurement upper limit so that they can be measured with acceptable accuracy. For example, if the wafer metrology tool's CD measurement upper limit is 1 µm for 1% measurement accuracy as discussed above, the dimensions W2 and D1 are designed to be equal to or less than 1 µm. This will result in a CD measurement error of at most 1% of 1 µm, which is 10 nm. For the same wafer metrology tool, if the dimensions W2 and D1 are designed to be about 0.5 µm (such as within 1% of 0.5 µm), then the CD measurement error is only about 5 nm, which is acceptable for many advanced process nodes. Still further, in the present embodiment, the dimensions W2 and D1 are designed to be large enough so that they do not cause printing distortion on the main pattern 202 in the lithography process. For example, even though the printing resolution of a lithography process may be 10 nm or less, the dimensions W2 and D1 are nonetheless designed to be about 100 nm or more in order to avoid causing distortion on the main pattern 202 due to optical effects. In some embodiments, the dimensions W2 and D1 are configured to range from 0.1 to 1 µm and are configured to have the same or different values. Furthermore, in the present embodiment, the CD assistant patterns 204 are configured to be symmetrical (same size W2 and same distance D1) about the center of the main pattern 202. In an alternative embodiment, the CD assistant patterns 204 are configured to be asymmetrical (different size W2 or different distance D1) about the center of the main pattern 202. Other considerations for designing the CD assistant patterns 204 may include the pattern density of the main patterns 202 and nearby main patterns, main patterns on adjacent layout layers above or under the layout layer 200 where the patterns 202 and 204 reside, and so on. One design criterion is that the CD assistant patterns 204 should not negatively impact the functionality of the IC.

Still referring to FIG. 2B, the CD assistant patterns 204 adjacent to top and bottom sides of the main pattern 202 along the vertical center line may be similarly configured in order to measure the CD of the main pattern 202 along the Y axis, which is not repeated herein for the sake of simplicity. Similarly, the L-shaped CD assist patterns 204 may be configured to have the dimension W2 and be gapped from the main pattern 202 by the dimension D1. In various embodiments, the module 138 may insert a pair of CD assistant patterns 204 adjacent left and right sides of the main pattern 202, a pair of CD assistant patterns 204 adjacent top and bottom sides of the main pattern 202, a pair of CD assistant patterns 204 adjacent top-left and top-right corners of the main pattern 202, a pair of CD assistant patterns 204 adjacent bottom-left and bottom-right corners of the main pattern 202, a pair of CD assistant patterns 204 adjacent top-left and bottom-left corners of the main pattern 202, a pair of CD assistant patterns 204 adjacent top-right and bottom-right corners of the main pattern 202, or a combination of the above mentioned CD assistant patterns. Further, each of the above mentioned CD assistant patterns may be in a bar shape, an L shape, or in other suitable shapes. As shown in FIG. 2B, a dimension W0 between center lines of a pair of the CD assistant patterns 204 can be expressed as (assuming the CD assistant patterns 204 are symmetrically configured):

$$W0 = W1 + W2 + 2*D1 \quad (1)$$

Figure 2C:
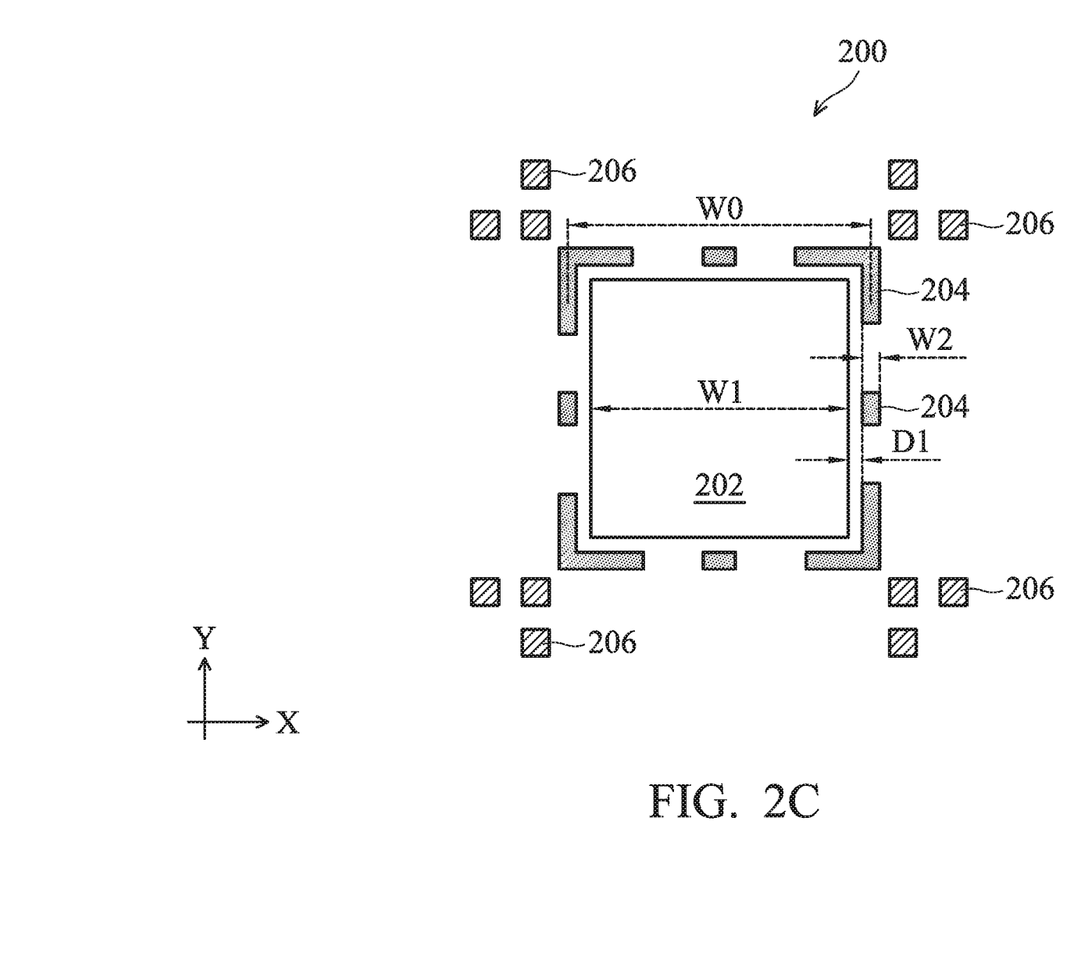

In some embodiments, the Data Preparation 132 (FIG. 1) may insert other types of assistant patterns in addition to the CD assistant patterns 204. One type of the assistant patterns is called "calibration assistant patterns," an embodiment of which is shown in FIG. 2C as the assistant patterns 206. Referring to FIG. 2C, the calibration assistant patterns 206 include a plurality of square blocks disposed outside a rectangular area that encloses the main pattern 202 and the CD assistant patterns 204. The calibration assistant patterns 206 are also printable in the lithography process. Further, the calibration assistant patterns 206 are spaced away from the nearby CD assistant patterns 204 by few micrometers, such as 10 µm, in the present embodiment. One function of the calibration assistant pattern 206 is for locating the CD assistant patterns 204 on a wafer. For example, after the patterns 204 and 206 are printed on a wafer (for the convenience of discussion, their counterparts on the wafer are still referred to as patterns 204 and 206), in order to locate the CD assistant patterns 204 which can be small, one may locate the calibration assistant patterns 206 first and then locate the CD assistant patterns 204 based on the known spatial relationship between the patterns 204 and 206. This may reduce the exposure of the CD assistant patterns 204 to the metrology tool's electron beams or ion beams, thereby reducing damages to the CD assistant patterns 204.

Figure 2D:
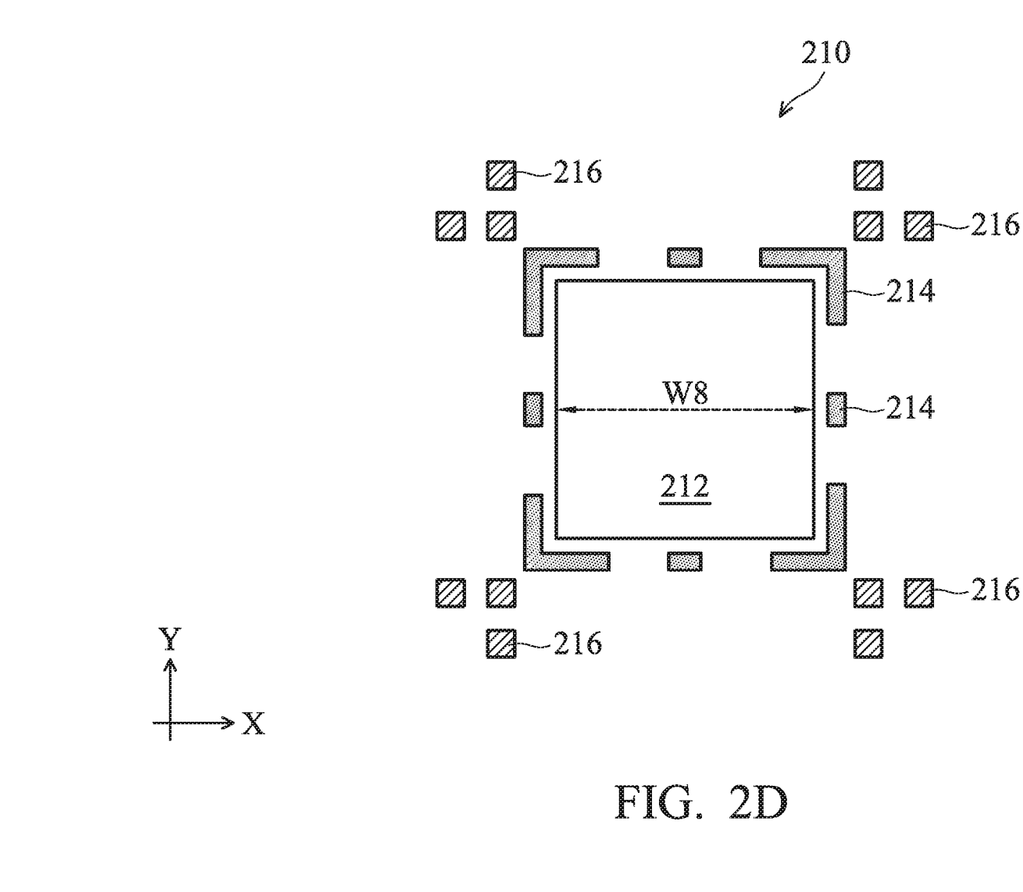
FIG. 2D illustrates another main pattern and a plurality of assistant patterns in an IC design layout, in accordance with some embodiments.

In some embodiments, the IC design layout 122 (FIG. 1) may include more than one pattern layers. Further, the different pattern layers may include circuit features that need to be properly aligned. For example, FIG. 2D illustrates a main pattern 212 in a pattern layer 210 of the IC design layout 122. The pattern layer 210 may be underneath or above the pattern layer 200 in the IC design layout 122 (and eventually in the IC device 160). In an embodiment, the main pattern 212 is designed to fully enclose the main pattern 202 from a top view and may be directly over or under the main pattern 202. A dimension W8 of the main pattern 212 along the X axis is greater than the dimension W1. As discussed above, measuring the CD of the main pattern 212 by a wafer metrology tool can be challenging. In the present embodiment, the Data Preparation 132 inserts CD assistant patterns 214 and calibration assistant patterns 216 adjacent to the main pattern 212, similar to what has been discussed with respect to the main pattern 202. Particularly, in the present embodiment, the size of the CD assistant patterns 214 is designed to be the same as the CD assistant patterns 204, and the spacing between the CD assistant patterns 214 and the main pattern 212 is designed to be the same as the spacing between the CD assistant patterns 204 and the main pattern 202. Advantageously, the CD assistant patterns (204 and 214) may be designed to be the same even though the associated main patterns (202 and 212) vary in size and/or shape.

Figure 2E:
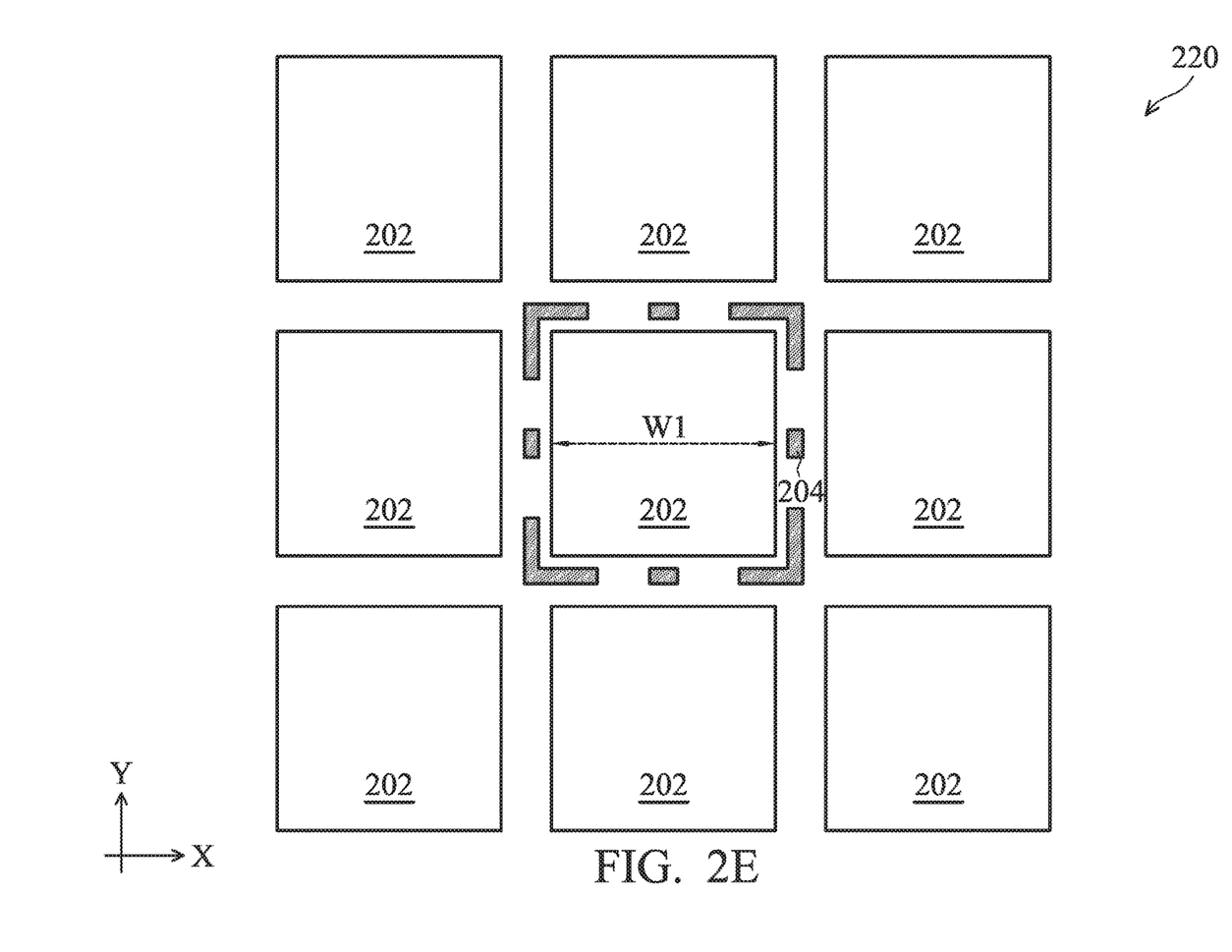
FIG. 2E illustrates an IC design layout with a plurality of main patterns and a plurality of assistant patterns, in accordance with some embodiments.

In some embodiments, a pattern layer in the IC design layout 122 (FIG. 1) may include a plurality of main patterns configured in an array. One example is shown in FIG. 2E. Referring to FIG. 2E, a pattern layer 220 of the IC design layout 122 includes an array of main patterns 202, each has the dimension W1 along the X axis. A set of CD assistant patterns 204 are inserted by the module 138 adjacent one of the main patterns 202. In an embodiment, each of the main patterns 202 may be associated with at least a pair of CD assistant patterns 204 (not shown) for aiding in the respective main pattern's CD measurement, as discussed above.

In some embodiments, the Data Preparation 132 (FIG. 1) may perform other operations to the IC design layout 122 in order to improve the manufacturability thereof. For example, it may perform an optical proximity correction (OPC). OPC uses lithography enhancement techniques to compensate for image errors, such as those that can arise from diffraction, interference, or other process effects. OPC may add assist features, such as scattering bars, serif, and/or hammerheads to the IC design layout 122 according to optical models or rules such that, after a lithography process, a final pattern on a wafer is improved with enhanced resolution and precision. The Data Preparation 132 (FIG. 1) may also perform a mask rule check and a lithography process check after the IC design layout 122 has been modified. For example, it may check the IC design layout 122 with a set of mask creation rules which may contain certain geometric and connectivity restrictions to ensure sufficient margins and to account for variability in semiconductor manufacturing processes. For example, it may simulate processes that will be implemented by the fab 150 to fabricate the IC device 160. The simulation may take into account various factors, such as aerial image contrast, depth of focus ("DOF"), mask error enhancement factor ("MEEF"), other suitable factors, or combinations thereof.

Referring to FIG. 1, after mask data preparation 132 and during mask fabrication 144, a mask 190 or a group of masks 190 are fabricated based on the modified IC design layout 122. For example, an electron-beam (e-beam) or a mechanism of multiple e-beams is used to form a pattern on a mask (photomask or reticle) based on the modified IC design layout. The mask 190 can be formed in various technologies. In one embodiment, the mask 190 is formed using binary technology. To further this embodiment, a mask pattern includes opaque regions and transparent regions. A radiation beam, such as an ultraviolet (UV) beam, used to expose the image sensitive material layer (e.g., photoresist) coated on a wafer, is blocked by the opaque region and transmits through the transparent regions. In one example, a binary mask includes a transparent substrate (e.g., fused quartz) and an opaque material (e.g., chromium) coated in the opaque regions of the mask. In another example, the mask 190 is formed using a phase shift technology. In the phase shift mask (PSM), various features in the pattern formed on the mask are configured to have proper phase difference to enhance the resolution and imaging quality. In various examples, the phase shift mask can be attenuated PSM or alternating PSM as known in the art. In yet another example, the mask 190 is formed to be a reflective mask. For example, a reflective mask may include a low thermal expansion material (LTEM) layer, a reflective multilayer (ML) over the LTEM layer, an absorber layer over the ML, and other layers. The ML is designed to reflect a radiation such as an extreme ultraviolet (EUV) light having a wavelength of about 1-100 nm. The absorber layer is designed to have certain mask patterns that determine how the radiation is reflected or absorbed.

In the present embodiment, the mask fabrication 144 creates the mask 190 having various mask patterns corresponding to the IC layout 122 as modified by the Data Preparation 132. For the convenience of discussion, the mask patterns and the layout patterns are designated with the same reference numerals. In that regard, FIGS. 2A-2E also show the various mask patterns of the mask 190. Using the pattern layer 200 of FIG. 2C as an example, the various mask patterns include a main mask pattern 202 corresponding to the main layout pattern 202, CD assistant mask patterns 204 corresponding to the CD assistant layout pattern 204, and calibration mask patterns 206 corresponding to the calibration layout patterns 206. In the present embodiment, a dimension W1 of the main mask pattern 202 along the X axis is greater than an upper limit of a wafer metrology tool's CD measurement capability. To further the embodiment, the CD assistant mask patterns 204 have a substantially same dimension W2 along the X axis and are about equally distanced from the main mask pattern 202 by a dimension D1. The dimensions W2 and D1 are greater than a printing resolution in a photolithography process and are equal to or less than the upper limit of the wafer metrology tool's CD measurement capability. Descriptions of the mask patterns shown in FIGS. 2B, 2D, and 2E are omitted for the sake of simplicity.

Referring to FIG. 1, the IC manufacturer 150, such as a semiconductor foundry, uses the mask (or masks) 190 to fabricate the IC device 160. The IC manufacturer 150 is an IC fabrication business that can include a myriad of manufacturing facilities for the fabrication of a variety of different IC products. For example, there may be a manufacturing facility for the front end fabrication of a plurality of IC products (i.e., front-end-of-line (FEOL) fabrication), while a second manufacturing facility may provide the back end fabrication for the interconnection and packaging of the IC products (i.e., back-end-of-line (BEOL) fabrication), and a third manufacturing facility may provide other services for the foundry business. In the present embodiment, a semiconductor wafer 152 is fabricated using the mask (or masks) 190 to form the IC device 160 using one or more photolithography processes (e.g., as illustrated in FIG. 3) and other suitable processes such as material deposition, etching, ion implantation, and epitaxial growth.

Figure 3:
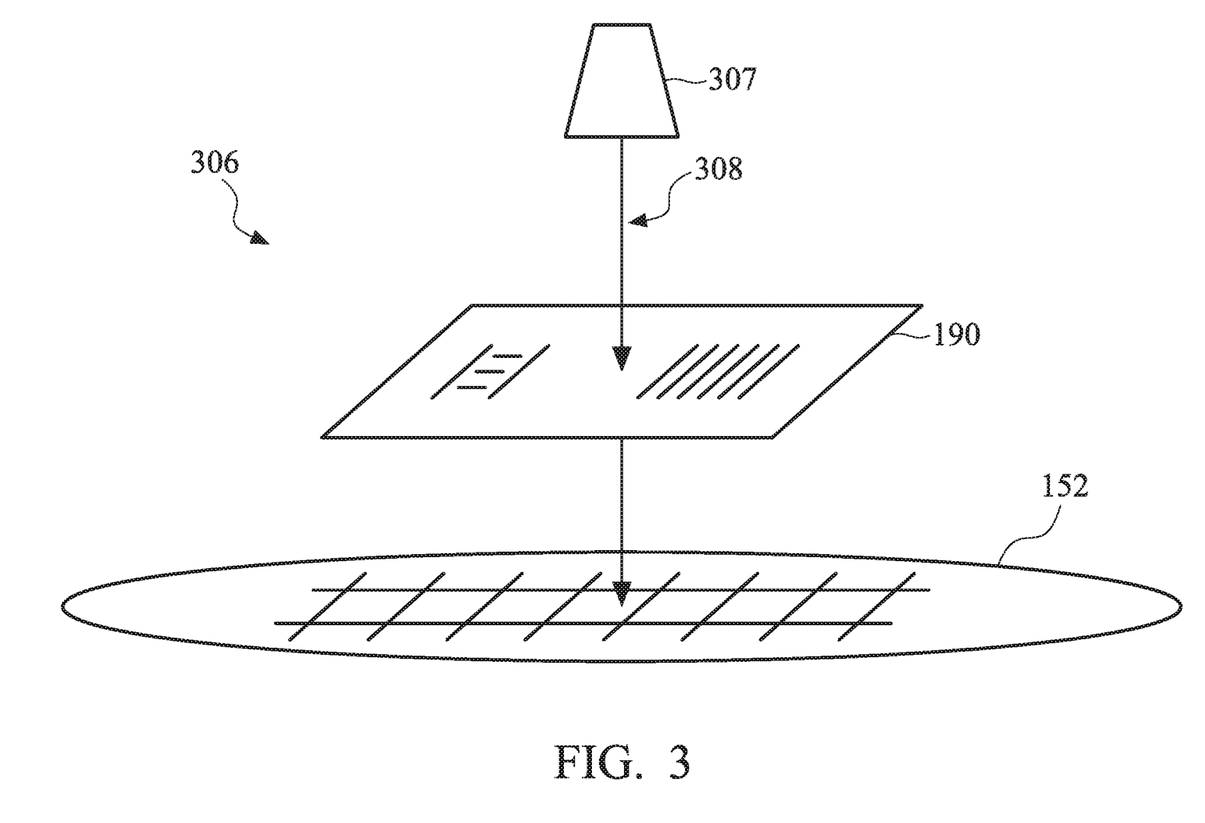
FIG. 3 illustrates a lithography process performed to a wafer and using a mask constructed according to embodiments of the present disclosure.
Figure 4A:
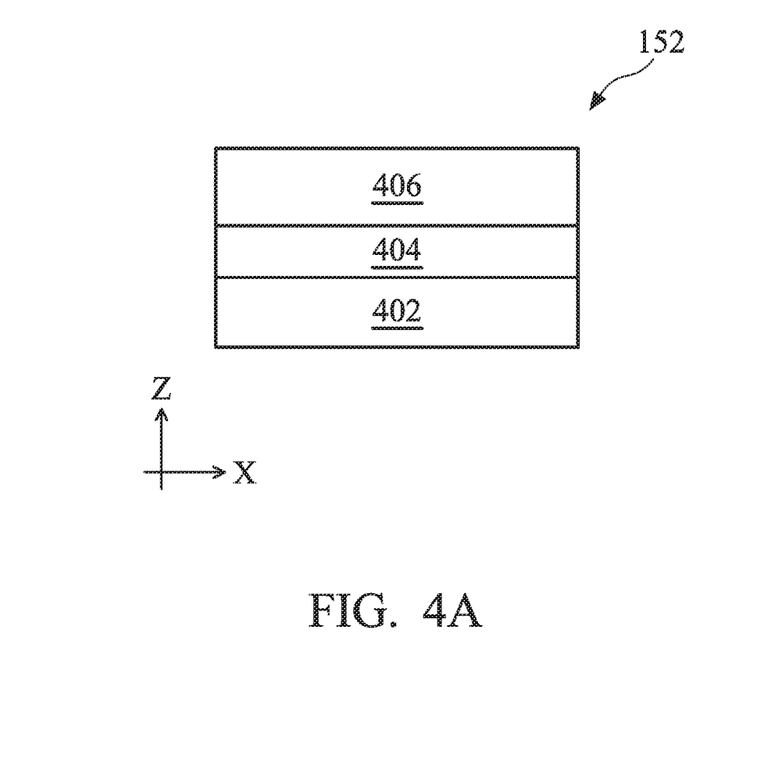
FIGS. 4A and 4B illustrate cross-sectional views of the wafer of FIG. 3 before and after resist patterns are developed, in accordance with some embodiments.
Figure 4B:
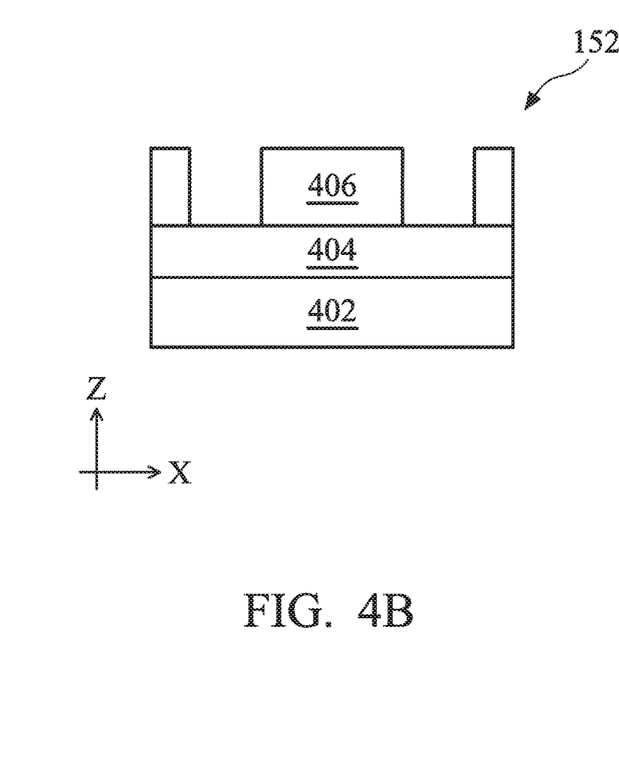
Figure 4C:
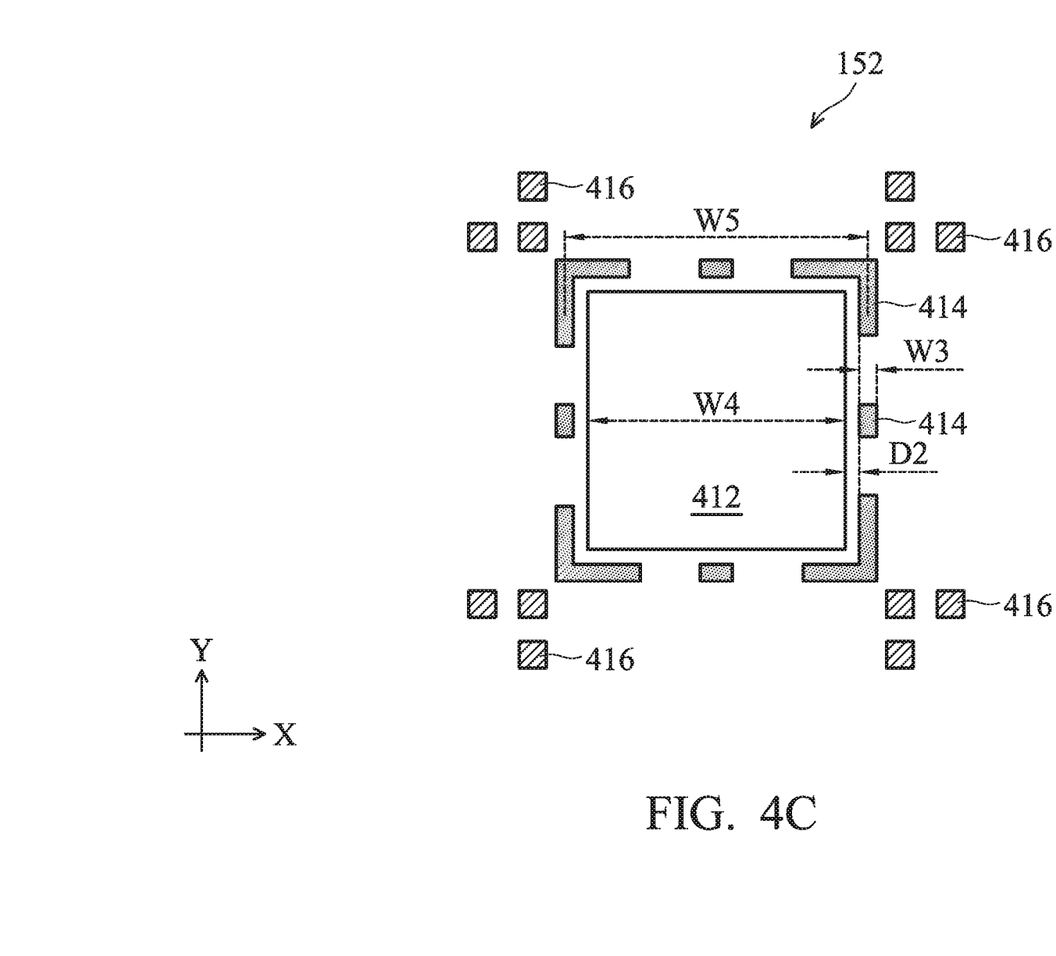
FIG. 4C illustrates a top view of the wafer of FIG. 3 with resist patterns, in accordance with some embodiments.

Referring to FIG. 3, the IC manufacturer 150 uses a photolithography system 306 (simplified) to perform the photolithography processes. The photolithography system 306 includes a light source 307 for projecting a radiation 308 onto the wafer 152 through the mask 190. Although not shown, various lenses can also be provided, as well as other light manipulating and/or transmitting devices. The radiation 308 may include an ultraviolet (UV) light, an extreme ultraviolet (EUV) light, an electron beam, an X-ray or an ion beam. The radiation 308 is patterned by the mask 190. The wafer 152 is coated with a radiation-sensitive resist layer for receiving the patterned radiation 308, thereby forming a latent image on the resist layer. The resist layer is subsequently developed to form resist patterns. In that regard, FIG. 4A shows the wafer 152 having a substrate 402, one or more material layers 404, and a resist layer 406 before being developed; FIG. 4B shows the wafer 152 after the resist layer 406 has been developed to form various resist patterns; and FIG. 4C shows a top view of the resist patterns, according to embodiments of the present disclosure.

Referring to FIG. 4A, the substrate 402 may be a silicon substrate or other proper substrate having material layers formed thereon or therein. The substrate 402 may include an elementary semiconductor, such as silicon, diamond, or germanium; a compound semiconductor, such as silicon carbide, indium arsenide, or indium phosphide; or an alloy semiconductor, such as silicon germanium carbide, gallium arsenic phosphide, or gallium indium phosphide. The substrate 402 may include various doped regions, dielectric features, and other suitable IC features. In various embodiments, the material layer 404 may include a high-k dielectric layer, a gate layer, a hard mask layer, an interfacial layer, a capping layer, a diffusion/barrier layer, an interlayer dielectric layer, an inter-metal dielectric layer, a conductive layer, other suitable layers, and/or combinations thereof. The resist layer 406 may be a positive photoresist or a negative photoresist, and may be formed by spin-on coating a liquid polymeric material onto the material layer 404. In an embodiment, the resist layer 406 is further treated with one or more baking processes.

Referring to FIG. 4B, after the resist layer 406 has been printed (or exposed) with a latent image of various mask patterns on the mask 190, it is developed to form resist patterns. The developing can be negative tone development (NTD) or positive tone development (PTD). In an NTD process, unexposed portions of the resist layer 406 are dissolved by a resist developer. In a PTD process, exposed portions of the resist layer 406 are dissolved by a resist developer. In either case, remaining portions of the resist layer 406 become the resist patterns (or resist features). Continuing with the exemplary layout patterns and mask patterns shown in FIG. 2C, the resist layer 406 is developed to include resist patterns 412, 414, and 416 as shown in FIG. 4C. The resist pattern 412 is a main resist pattern, printed from the main mask pattern 202. The resist patterns 414 are CD assistant resist patterns, printed from the CD assistant mask patterns 204. The resist patterns 416 are calibration assistant resist patterns, printed from the calibration assistant mask patterns 206. The main resist pattern 412 has a dimension W4 along the X axis. The pair of CD assistant resist patterns 414 adjacent left and right sides of the main resist pattern 412 each have a dimension W3 along the X axis, and are about equally distanced from the main resist pattern 412 by a dimension D2. As shown in FIG. 4C, a dimension W5 between center lines of the pair of the CD assistant resist patterns 404 can be expressed as (assuming the patterns 204 of FIG. 2C are symmetrically configured):

$$W5=W4+W3+2*D2 \quad (2)$$

Due to various factors, the dimensions W4, W3, and D2 may or may not match the dimensions W1, W2, and D1 (FIG. 2C), respectively. However, the dimension W5 generally matches the dimension W0. In other words, $$W1+W2+2*D1=W4+W3+2*D2 \quad (3)$$

Factors that affect the shapes and sizes of the resist patterns 412, 414, and 416 include pattern shapes and pattern density on the mask 190, reflectivity or transparency of the mask 190, sensitivity and thickness of the resist layer 406, resist film loss during the development, depth of focus, exposure dose variations, temperature(s) and time variations during post-exposure baking, and characteristics of the developing solution.

The IC manufacturer 150 further performs an after-development-inspection (ADI) process on the resist patterns. In the present embodiment, the ADI process includes determining the dimensions W4, W3, and D2. Further, the ADI process is performed in-line with a wafer metrology tool, such as a scanning electron microscope. As discussed in the Background section, measuring CD of a large resist pattern, such as the main resist pattern 412, using wafer metrology tools can be challenging. For example, a typical commercial wafer metrology tool may have an upper limit of 1 μm for CD measurement for a guaranteed 1% measurement accuracy (i.e., the difference between the actual CD and the measured CD is within 1%). When a resist pattern's actual CD exceeds this upper limit, the measurement accuracy may become worse than 1%. For example, if the dimension W4 is greater than 10 μm, directly measuring the dimension W4 using a wafer metrology tool may result in a measurement error of 100 nm or more. That may be unacceptable for some process nodes. In the present embodiment, the IC manufacturer 150 measures the dimensions W3 and D2, and calculates the dimension W4 using the dimensions W1, W2, D1, W3, and D2.

In an embodiment, the dimension W4 can be derived from the question (3) as:

$$W4=W1+2*(D1-D2)+(W2-W3) \quad (4)$$

In the equation (4), the dimensions W1, D1, and W2 are considered accurate because they are the target dimensions from the layout 122 or from the mask 190. The dimensions D2 and W3 are measured with a wafer metrology tool. The dimensions D2 and W3 are designed to be within the upper limit of the wafer metrology tool's CD measurement capability. For example, if the upper limit of the wafer metrology tool's CD measurement capability is 1 μm, the dimensions D2 and W3 are designed to be ranging from 0.1 to 1 μm. For example, the dimensions D2 and W3 are designed to be about 0.5 μm. If the measurement accuracy is about 1%, then CD measurement errors of the dimensions D2 and W3 are about 5 nm. Effectively, W4 is obtained with a CD measurement error of about 5 nm. This is much smaller than measuring W4 directly with the wafer metrology tool.

In an alternative embodiment, the IC manufacturer 150 may measure the dimensions of the pair of the CD assistant resist patterns 414 separately as $W3_{left}$ and $W3\_{right}$ (not shown), measure the dimensions of the pair of the gaps between the CD assistant resist patterns 414 and the main resist pattern 412 separately as $D2_{left}$ and $D2\_{right}$ (not shown), and calculate the dimension W4 as:

$$W4=W1+2*D1-D2\_{left}-D2\_{right}+W2-0.5*(W3\_{left}+W3\_{right}) \quad (5)$$

The dimension of the main resist pattern 412 along the Y axis can be similarly obtained by measuring the CDs of the assistant patterns 414 and the associated gaps configured along the Y axis. Further, the CD assistant resist patterns 414 adjacent the corners of the main resist pattern 412 can be used instead of those adjacent the center lines of the main resist pattern 412. Still further, CDs of the main resist pattern 412 can be calculated using other equations besides the equations (4) and (5).

After checking the CD of the main resist patterns 412, the IC manufacturer 150 may perform further steps. For example, if the CD of the main resist patterns 412 does not meet a target CD, the resist patterns 412, 414, and 416 may be stripped, and a new resist layer 406 is coated, exposed, and developed with a different set of lithography parameters aiming to improve the CD of the developed resist patterns. On the other hand, if the CD of the main resist patterns 412 meets the target CD, the IC manufacturer 150 may use the resist patterns 412, 414, and 416 as an etching mask to etch the material layer 404. Accordingly, the patterns 412, 414, and 416 are transferred to the material layer 404, and eventually to the IC device 160.

Figure 5:
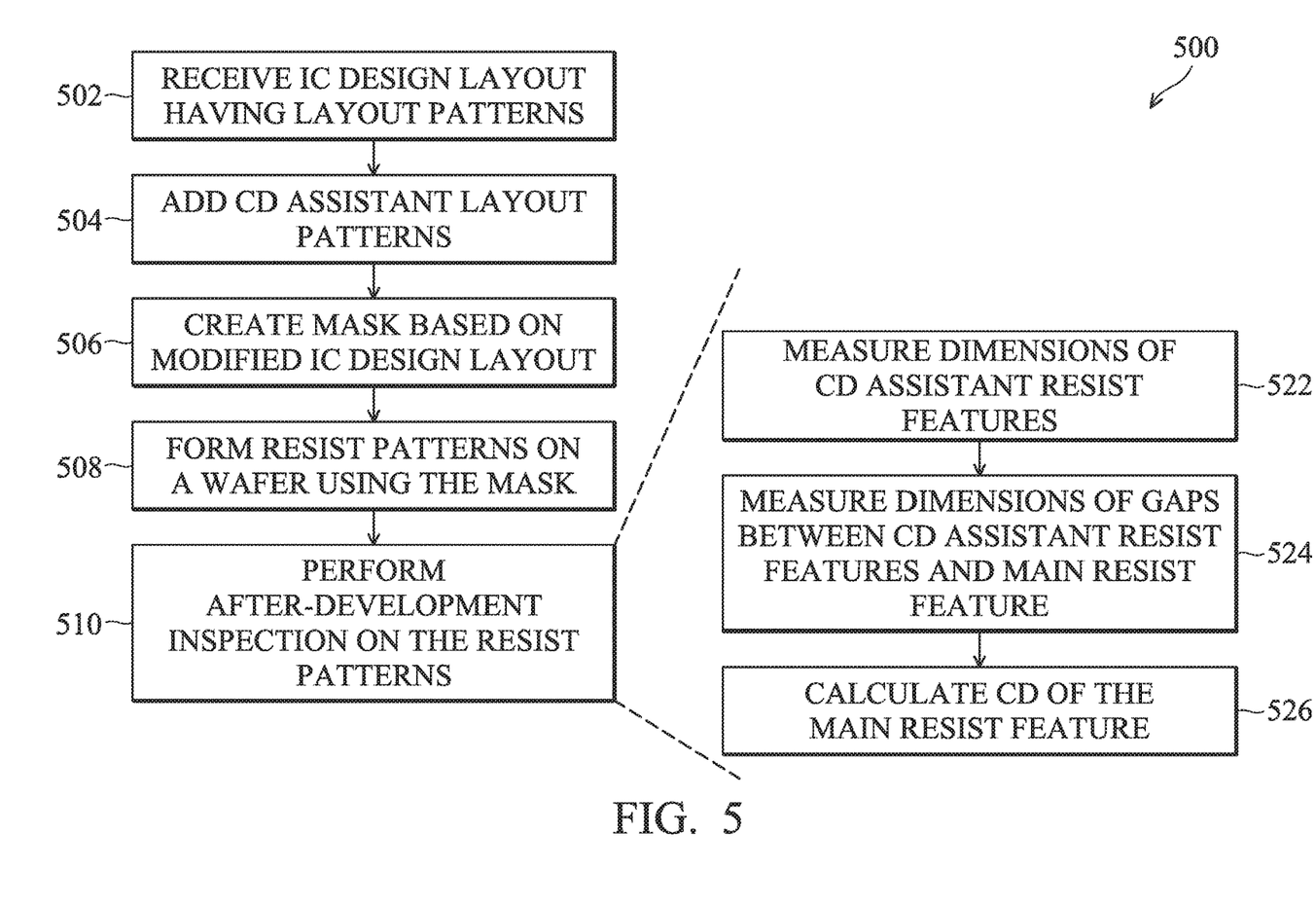
FIG. 5 is a high-level flowchart of a method of adding assistant patterns in an IC design layout for the benefits of measuring CDs of a main pattern on a wafer, according to various aspects of the present disclosure.

FIG. 5 is a flow chart of a method 500 for manufacturing an IC according to various embodiments of the present disclosure. The method 500 may be implemented, in whole or in part, by the IC manufacturing system 100. Additional operations can be provided before, during, and after the method 500, and some operations described can be replaced, eliminated, or moved around for additional embodiments of the method. The method 500 is an example, and is not intended to limit the present disclosure beyond what is explicitly recited in the claims. The method 500 is briefly described below in conjunction with FIGS. 1-4C.

At operation 502, the method 500 (FIG. 5) receives an IC design layout having layout patterns. For example, the IC design layout may be provided in a computer-readable file format such as GDSII, DFII, or other suitable file formats. The layout patterns may include a large main layout pattern such as the main layout pattern 202 (FIG. 2A).

At operation 504, the method 500 (FIG. 5) inserts assistant patterns adjacent the large main layout pattern, thereby modifying the IC design layout. For example, the method 500 may insert CD assistant layout patterns 204 for aiding in the CD measurement of the main layout pattern 202 as shown in FIG. 2B. Further, the method 500 may insert calibration assistant layout patterns 206 as shown in FIG. 2C.

At operation 506, the method 500 (FIG. 5) creates one or more masks based on the modified IC design layout. For example, the method 500 may create one or more masks 190 (FIG. 1) having mask patterns as illustrated in FIG. 2C, 2D, or 2E. The mask patterns include a main mask pattern corresponding to the main layout pattern 202, CD assistant mask patterns corresponding to the CD assistant layout patterns 204, and calibration assistant mask patterns corresponding to the calibration assistant layout patterns 206.

At operation 508, the method 500 (FIG. 5) forms resist patterns on a wafer using the one or more masks. For example, the resist patterns may be formed using the lithography system 306 (FIG. 3). Further, the resist patterns may include the main resist pattern 412, the CD assistant resist patterns 414, and the calibration assistant resist patterns 416, as shown in FIG. 4C.

At operation 510, the method 500 (FIG. 5) performs after-development inspection (ADI) of the resist patterns. In the present embodiment, the operation 510 includes measuring dimensions of CD assistant resist patterns (e.g., dimension W3 of FIG. 4C) in operation 522, measuring dimensions of gaps between the CD assistant resist patterns and the main resist pattern (e.g., dimension D2 of FIG. 4C) in operation 524, and calculating a dimension of the main resist pattern (e.g., dimension W4 of FIG. 4C) in operation 526. Various aspects the method 500 are similar to what has been described above with respect to the IC manufacturing system 100. Therefore, they are omitted herein for the sake of simplicity.

Figure 6:
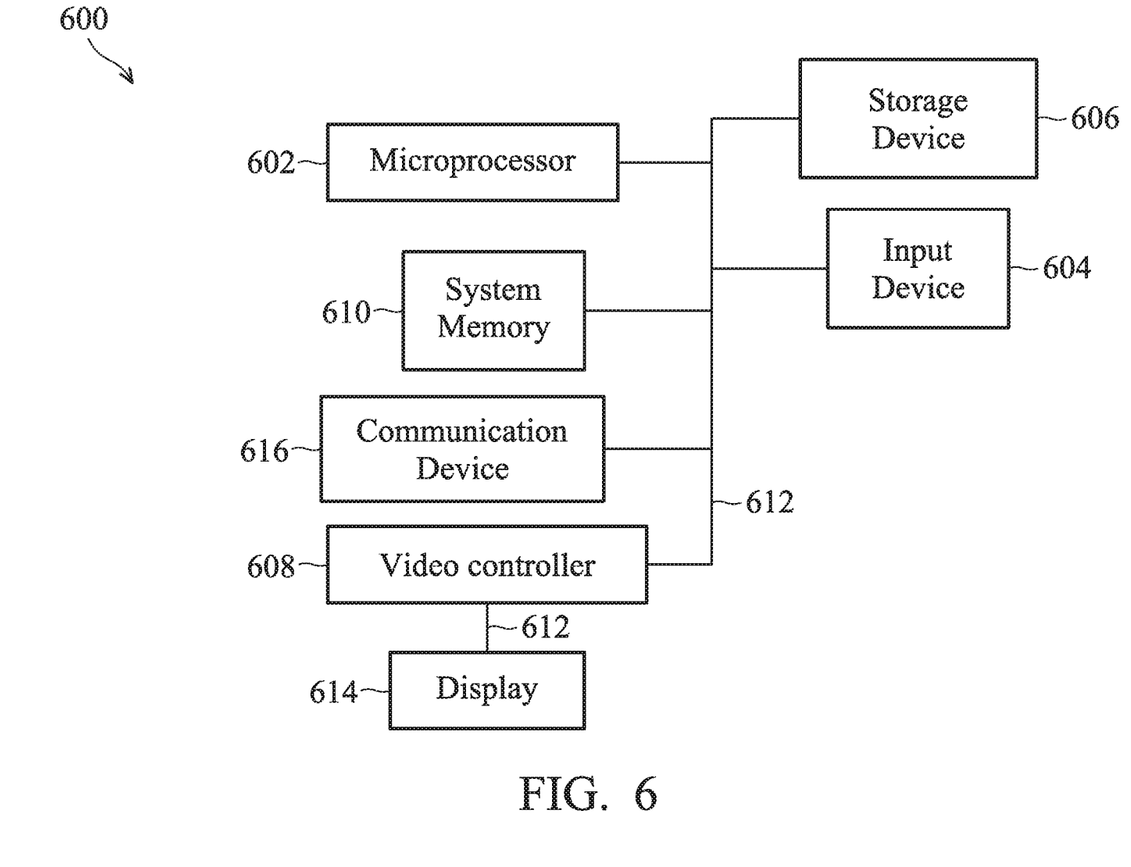
FIG. 6 is an illustration of a computer system for implementing one or more embodiments of the present disclosure.

Referring now to FIG. 6, shown therein is a mask house tool 600 for implementing certain operations of the method 500 above, such as operations 502 and 504. The mask house tool 600 is a specialized computer system in an embodiment. For example, the specialized computer system implements certain steps, processes, operations, or methods described with respect to the Data Preparation 132 and the module 138 (FIG. 1). Particularly, certain operations of the Data Preparation 132 and the module 138 improve the computer system's capability of producing IC layouts with enhanced manufacturability.

In the present embodiment, the tool 600 includes a microprocessor 602, an input device 604, a storage device 606, a video controller 608, a system memory 610, a display 614, and a communication device 616 all interconnected by one or more buses 612. The storage device 606 could be a floppy drive, hard drive, CD-ROM, optical drive, or any other form of storage device. In addition, the storage device 606 may be capable of receiving a floppy disk, CD-ROM, DVD-ROM, or any other form of computer-readable medium that may contain computer-executable instructions. Further, communication device 616 could be a modem, network card, or any other device to enable the computer system to communicate with other nodes. It is understood that any computer system could represent a plurality of interconnected (whether by intranet or Internet) computer systems, including without limitation, personal computers, mainframes, PDAs, and cell phones.

A computer system typically includes at least hardware capable of executing machine readable instructions, as well as the software for executing acts (typically machine-readable instructions) that produce a desired result. In addition, a computer system may include hybrids of hardware and software, as well as computer sub-systems.

Hardware generally includes at least processor-capable platforms, such as client-machines (also known as personal computers or servers), and hand-held processing devices (such as smart phones, personal digital assistants (PDAs), or personal computing devices (PCDs), for example). Further, hardware may include any physical device that is capable of storing machine-readable instructions, such as memory or other data storage devices. Other forms of hardware include hardware sub-systems, including transfer devices such as modems, modem cards, ports, and port cards, for example.

Software includes any machine code stored in any memory medium, such as RAM or ROM, and machine code stored on other devices (such as floppy disks, flash memory, or a CD ROM, for example). Software may include source or object code, for example. In addition, software encompasses any set of instructions capable of being executed in a client machine or server.

Combinations of software and hardware could also be used for providing enhanced functionality and performance for certain embodiments of the present disclosure. One example is to directly manufacture software functions into a silicon chip. Accordingly, it should be understood that combinations of hardware and software are also included within the definition of a computer system and are thus envisioned by the present disclosure as possible equivalent structures and equivalent methods.

Computer-readable mediums include passive data storage, such as a random access memory (RAM) as well as semi-permanent data storage such as a compact disk read only memory (CD-ROM). In addition, an embodiment of the present disclosure may be embodied in the RAM of a computer to transform a standard computer into a new specific computing machine.

Not intended to be limiting, embodiments of the present disclosure provide many benefits for manufacturing semiconductor devices. For example, during after-development inspection, a critical dimension (CD) of a large main pattern (e.g., CD is about 1 to 50 µm) can be obtained with increased accuracy without changing the wafer metrology tools. In embodiments, a CD of a large main pattern is derived by measuring CDs of much smaller assistant patterns and calculating the CD of the large main pattern based on layout (or mask) patterns and the CDs of the smaller assistant patterns.

In one exemplary aspect, the present disclosure is directed to a method. The method includes receiving an integrated circuit (IC) layout having a pattern layer. The pattern layer includes a main layout pattern. A dimension W1 of the main layout pattern along a first direction is greater than a wafer metrology tool's critical dimension (CD) measurement upper limit. The method further includes adding a plurality of assistant layout patterns into the pattern layer by a mask house tool. The plurality of assistant layout patterns includes a pair of CD assistant layout patterns on both sides of the main layout pattern along the first direction. The pair of CD assistant layout patterns have a substantially same dimension W2 along the first direction and are about equally distanced from the main layout pattern by a dimension D1. The dimensions W2 and D1 are greater than a printing resolution in a photolithography process and are equal to or less than the wafer metrology tool's CD measurement upper limit.

In another exemplary aspect, the present disclosure is directed to a method. The method includes providing an integrated circuit (IC) mask comprising a main mask pattern and two critical dimension (CD) assistant mask patterns on both sides of the main mask pattern along a first direction.

A dimension W1 of the main mask pattern along the first direction is greater than an upper limit of a wafer metrology tool's CD measurement capability. The CD assistant mask patterns have a substantially same dimension W2 along the first direction and are about equally distanced from the main mask pattern by a dimension D1. The dimensions W2 and D1 are greater than a printing resolution in a photolithography process and are equal to or less than the upper limit of the wafer metrology tool's CD measurement capability. The method further includes forming resist patterns on a wafer using the IC mask and the photolithography process. The resist patterns include a main resist pattern printed from the main mask pattern and two CD assistant resist patterns printed from the CD assistant mask patterns. The method further includes measuring a dimension W3 of one of the CD assistant resist patterns along the first direction using the wafer metrology tool, measuring a dimension D2 of a gap between the one of the CD assistant resist patterns and the main resist pattern along the first direction using the wafer metrology tool, and calculating a dimension W4 of the main resist pattern along the first direction using at least W1, W2, W3, D1, and D2.

In yet another exemplary aspect, the present disclosure is directed to a method. The method includes providing an integrated circuit (IC) mask comprising a main mask pattern and two critical dimension (CD) assistant mask patterns on both sides of the main mask pattern along a first direction. A dimension W1 of the main mask pattern along the first direction is greater than a wafer metrology tool's CD measurement upper limit. The CD assistant mask patterns each have a dimension W2 along the first direction and each are gapped from the main mask pattern by a dimension D1. The dimensions W2 and D1 are greater than a printing resolution in a photolithography process and are equal to or less than the wafer metrology tool's CD measurement upper limit. The method further includes forming resist patterns on a wafer using the IC mask and the photolithography process, wherein the resist patterns include a main resist pattern printed from the main mask pattern and two CD assistant resist patterns printed from the CD assistant mask patterns. The method further includes measuring a dimension W3 of one of the CD assistant resist patterns along the first direction using the wafer metrology tool, measuring a dimension D2 of a gap between the one of the CD assistant resist patterns and the main resist pattern along the first direction using the wafer metrology tool, and calculating a dimension W4 of the main resist pattern along the first direction as $W4=W1+2*(D1-D2)+(W2-W3)$.

The foregoing outlines features of several embodiments so that those of ordinary skill in the art may better understand the aspects of the present disclosure. Those of ordinary skill in the art should appreciate that they may readily use the present disclosure as a basis for designing or modifying other processes and structures for carrying out the same purposes and/or achieving the same advantages of the embodiments introduced herein. Those of ordinary skill in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
    receiving an integrated circuit (IC) layout having a pattern layer, wherein the pattern layer includes a main layout pattern, and a dimension W1 of the main layout pattern along a first direction is greater than a wafer metrology tool's critical dimension (CD) measurement upper limit; and
    adding a plurality of assistant layout patterns into the pattern layer by a mask house tool, wherein the plurality of assistant layout patterns includes a pair of CD assistant layout patterns on both sides of the main layout pattern along the first direction, wherein the pair of CD assistant layout patterns have a substantially same dimension W2 along the first direction and are about equally distanced from the main layout pattern by a dimension D1, and wherein the dimensions W2 and D1 are greater than a printing resolution in a photolithography process and are equal to or less than the wafer metrology tool's CD measurement upper limit.

2. The method of claim 1, further comprising:
    forming a mask using the IC layout with the main layout pattern and the plurality of assistant layout patterns, wherein the mask has a main mask pattern corresponding to the main layout pattern and a pair of CD assistant mask patterns corresponding to the pair of CD assistant layout patterns; and
    forming resist patterns on a wafer using the mask and the photolithography process, wherein the resist patterns include a main resist pattern printed from the main mask pattern and a pair of CD assistant resist patterns printed from the pair of CD assistant mask patterns.

3. The method of claim 2, further comprising:
    measuring dimensions of the CD assistant resist patterns along the first direction using the wafer metrology tool;
    measuring dimensions of gaps between the CD assistant resist patterns and the main resist pattern along the first direction using the wafer metrology tool; and
    calculating a dimension W4 of the main resist pattern along the first direction using the dimensions of the CD assistant resist patterns and the dimensions of the gaps.

4. The method of claim 2, further comprising:
    measuring a dimension W3 of one of the CD assistant resist patterns along the first direction using the wafer metrology tool;
    measuring a dimension D2 of a gap between the one of the CD assistant resist patterns and the main resist pattern along the first direction using the wafer metrology tool; and
    calculating a dimension W4 of the main resist pattern along the first direction using the dimensions W1, W2, W3, D1, and D2.

5. The method of claim 4, wherein the dimension W4 of the main resist pattern is calculated as $W4=W1+2*(D1-D2)+(W2-W3)$.

6. The method of claim 1, wherein the dimension W2 ranges from 0.1 to 1 µm, and the dimension D1 ranges from 0.1 to 1 µm.

7. The method of claim 1, wherein the dimension W2 is about 0.5 µm, and the dimension D1 is about 0.5 µm.

8. The method of claim 1, wherein the pair of the CD assistant layout patterns are bar-shaped.

9. The method of claim 1, wherein the pair of the CD assistant layout patterns are L-shaped.

10. The method of claim 1, wherein the plurality of assistant layout patterns further includes a calibration layout pattern that is disposed outside a rectangular area enclosing the main layout pattern and the pair of CD assistant layout patterns, wherein a size of the calibration layout pattern is greater than the printing resolution in the photolithography process.

11. The method of claim 1, wherein the IC layout has another pattern layer over the pattern layer, the another pattern layer includes another main layout pattern directly over and enclosing the main layout pattern, further comprising:
  adding another pair of CD assistant layout patterns on both sides of the another main layout pattern along the first direction, wherein the another pair of CD assistant layout patterns have substantially the same dimension W2 along the first direction and are about equally distanced from the another main layout pattern by the dimension D1.

12. A method, comprising:
  providing an integrated circuit (IC) mask comprising a main mask pattern and two critical dimension (CD) assistant mask patterns on both sides of the main mask pattern along a first direction, wherein:
    a dimension W1 of the main mask pattern along the first direction is greater than an upper limit of a wafer metrology tool's CD measurement capability,
    the CD assistant mask patterns have a substantially same dimension W2 along the first direction and are about equally distanced from the main mask pattern by a dimension D1, and
    the dimensions W2 and D1 are greater than a printing resolution in a photolithography process and are equal to or less than the upper limit of the wafer metrology tool's CD measurement capability;
  forming resist patterns on a wafer using the IC mask and the photolithography process, wherein the resist patterns include a main resist pattern printed from the main mask pattern and two CD assistant resist patterns printed from the CD assistant mask patterns;
  measuring a dimension W3 of one of the CD assistant resist patterns along the first direction using the wafer metrology tool;
  measuring a dimension D2 of a gap between the one of the CD assistant resist patterns and the main resist pattern along the first direction using the wafer metrology tool; and
  calculating a dimension W4 of the main resist pattern along the first direction using at least W1, W2, W3, D1, and D2.

13. The method of claim 12, wherein the dimension W4 of the main resist pattern is calculated as $W4=W1+2*(D1-D2)+(W2-W3)$.

14. The method of claim 12, wherein the dimensions W2 and D1 are substantially equal.

15. The method of claim 12, wherein the IC mask further comprises another main mask pattern disposed opposite the main mask pattern with respect to one of the CD assistant mask pattern, wherein the another main mask pattern has same dimensions as the main mask pattern.

16. The method of claim 12, wherein the IC mask further comprises calibration patterns that are disposed outside a rectangular area enclosing the main mask pattern and the CD assistant mask patterns, wherein each of the calibration patterns is greater than the printing resolution in the photolithography process.

17. The method of claim 12, wherein the main mask pattern includes a rectangular shape, the first direction is along a center line of the rectangular shape, and the CD assistant mask patterns are bar-shaped.

18. The method of claim 12, wherein the main mask pattern includes a rectangular shape, and the CD assistant mask patterns are L-shaped and are disposed around corners of the rectangular shape.

19. The method of claim 12, before the providing of the IC mask, further comprising:
  receiving an IC layout having a main layout pattern that has the dimension W1 along the first direction;
  inserting two CD assistant layout patterns on both sides of the main layout pattern along the first direction, wherein the CD assistant layout patterns have substantially the same dimension W2 along the first direction and are about equally distanced from the main layout pattern by the dimension D1; and
  forming the IC mask using the IC layout with the main layout pattern and the CD assistant layout patterns, wherein the main mask pattern corresponds to the main layout pattern, and the CD assistant mask patterns correspond to the CD assistant layout patterns.

20. A method, comprising:
  providing an integrated circuit (IC) mask comprising a main mask pattern and two critical dimension (CD) assistant mask patterns on both sides of the main mask pattern along a first direction, wherein:
    a dimension W1 of the main mask pattern along the first direction is greater than a wafer metrology tool's CD measurement upper limit,
    the CD assistant mask patterns each have a dimension W2 along the first direction and each are gapped from the main mask pattern by a dimension D1, and
    the dimensions W2 and D1 are greater than a printing resolution in a photolithography process and are equal to or less than the wafer metrology tool's CD measurement upper limit;
  performing a mask rule check on the IC mask with a set of mask creation rules;
  forming resist patterns on a wafer using the IC mask and the photolithography process, wherein the resist patterns include a main resist pattern printed from the main mask pattern and two CD assistant resist patterns printed from the CD assistant mask patterns;
  measuring a dimension W3 of one of the CD assistant resist patterns along the first direction using the wafer metrology tool;
  measuring a dimension D2 of a gap between the one of the CD assistant resist patterns and the main resist pattern along the first direction using the wafer metrology tool; and
  calculating a dimension W4 of the main resist pattern along the first direction as $W4=W1+2*(D1-D2)+(W2-W3)$.

* * * * *